United States Patent
Vyas et al.

(10) Patent No.: US 11,366,583 B1
(45) Date of Patent: Jun. 21, 2022

(54) COMPUTER-TO-COMPUTER USERS# EDIT AND EVENT TRANSFER AND SYNCHRONIZATION

(71) Applicant: Bank of America Corporation, Charlotte, NC (US)

(72) Inventors: Ketul Sureshbhai Vyas, Edison, NJ (US); Rachit Patel, Newtown, PA (US); Kartikiran Seshagiri, Chesterfield, NJ (US); Vimalnath Umapathi, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/165,261

(22) Filed: Feb. 2, 2021

(51) Int. Cl.
*G06F 3/04845* (2022.01)
*H04L 67/02* (2022.01)
*G06F 9/54* (2006.01)
*G06F 9/52* (2006.01)

(52) U.S. Cl.
CPC ............ *G06F 3/04845* (2013.01); *G06F 9/52* (2013.01); *G06F 9/547* (2013.01); *H04L 67/02* (2013.01)

(58) Field of Classification Search
CPC ........ G06F 3/04845; G06F 9/52; G06F 9/547; H04L 67/02
See application file for complete search history.

(56) References Cited

U.S. PATENT DOCUMENTS

| | | | |
|---|---|---|---|
| 7,236,926 B2 | 6/2007 | Scherpbier et al. | |
| 7,308,476 B2 | 12/2007 | Mannaru et al. | |
| 7,389,473 B1 * | 6/2008 | Sawicki | G06F 40/143 715/255 |
| 7,426,193 B2 | 9/2008 | Roher et al. | |
| 7,774,703 B2 * | 8/2010 | Junuzovic | G06Q 10/10 715/246 |
| 7,813,304 B2 | 10/2010 | Salesky et al. | |
| 7,908,322 B2 | 3/2011 | Eisenberg | |
| 8,175,244 B1 | 5/2012 | Frankel | |
| 8,194,646 B2 | 6/2012 | Elliott et al. | |
| 8,194,841 B2 | 6/2012 | Archambault et al. | |

(Continued)

OTHER PUBLICATIONS

Cayenne-McCall, Lawrence, "Synchronous 3D Document Collaboration," Pace University, Nov. 2008 (41 pages) (Year: 2008).*

(Continued)

*Primary Examiner* — Eric J. Bycer (57) ABSTRACT

A system for establishing a collaborative environment to facilitate co-editing on a web application receives, from a first user, a request to create a virtual collaboration room for the first user and a second user. The system transmits the web application to a first computing device associated with the first user such that a first session of the web application is displayed on the first computing device. The system transmits the web application to a second computing device associated with the second user such that a second session of the web application is displayed on the second computing device. The system synchronously modifies the first session and the second session with user events performed by any of the users. The system detects a request to commit the latest modifications of the user events to the web application stored in the memory, and commits the latest modifications to the web application.

20 Claims, 3 Drawing Sheets

(56) References Cited

U.S. PATENT DOCUMENTS

| | | | |
|---|---|---|---|
| 8,208,001 B2 | 6/2012 | Tucker et al. | |
| 8,368,738 B2 | 2/2013 | Schindler | |
| 8,392,503 B2 | 3/2013 | Kuhlke et al. | |
| 8,407,290 B2* | 3/2013 | Abt, Jr. | G06F 16/958 709/205 |
| 8,555,339 B2 | 10/2013 | McGloin et al. | |
| 8,626,847 B2 | 1/2014 | Jones et al. | |
| 8,812,510 B2 | 8/2014 | Romanov et al. | |
| 8,817,668 B2 | 8/2014 | Sekaran et al. | |
| 8,850,522 B2 | 9/2014 | Vakil et al. | |
| 8,914,452 B2 | 12/2014 | Boston et al. | |
| 9,032,028 B2 | 5/2015 | Davidson et al. | |
| 9,148,627 B2 | 9/2015 | Anderson et al. | |
| 9,189,143 B2 | 11/2015 | Jones et al. | |
| 9,218,102 B1* | 12/2015 | Greenspan | G06F 40/166 |
| 9,247,204 B1 | 1/2016 | Yin et al. | |
| 9,280,529 B2* | 3/2016 | Lemonik | G06F 40/166 |
| 9,292,814 B2 | 3/2016 | Bentley et al. | |
| 9,380,268 B2 | 6/2016 | Weber et al. | |
| RE46,206 E | 11/2016 | Jorgensen | |
| 9,516,076 B2 | 12/2016 | Ellison et al. | |
| 9,525,711 B2 | 12/2016 | Ackerman et al. | |
| 9,525,849 B2 | 12/2016 | Periyannan et al. | |
| 9,560,206 B2 | 1/2017 | Jones et al. | |
| 9,576,190 B2 | 2/2017 | Shaburov et al. | |
| 9,685,193 B2 | 6/2017 | Cunico et al. | |
| 9,712,569 B2 | 7/2017 | Vashishtha et al. | |
| 9,832,237 B2 | 11/2017 | Lock et al. | |
| 9,836,546 B2 | 12/2017 | Briere et al. | |
| 9,881,282 B1 | 1/2018 | Narayanaswamy | |
| 9,924,137 B2 | 3/2018 | Power et al. | |
| 9,965,638 B2 | 5/2018 | Pittenger et al. | |
| 10,033,967 B2 | 7/2018 | Segal et al. | |
| 10,051,020 B2* | 8/2018 | Keslin | H04L 65/4015 |
| 10,091,461 B2 | 10/2018 | Eisenberg et al. | |
| 10,171,524 B2 | 1/2019 | Privat | |
| 10,284,635 B2 | 5/2019 | Yang et al. | |
| 10,346,532 B2* | 7/2019 | Codrington | G06F 16/2282 |
| 10,586,541 B2 | 3/2020 | Kashtan et al. | |
| 10,666,696 B2 | 5/2020 | Bader-Natal et al. | |
| 2010/0083136 A1* | 4/2010 | Komine | G06F 9/52 715/753 |
| 2010/0257457 A1* | 10/2010 | De Goes | H04L 65/1093 715/751 |
| 2011/0078246 A1* | 3/2011 | Dittmer-Roche | G06F 40/197 709/205 |
| 2011/0296317 A1* | 12/2011 | Ishihara | G06Q 10/10 715/753 |
| 2013/0138733 A1* | 5/2013 | Heinrich | G06F 40/166 709/204 |
| 2013/0218845 A1* | 8/2013 | Kleppner | G06F 16/176 707/687 |
| 2014/0280595 A1 | 9/2014 | Mani et al. | |
| 2015/0092616 A1 | 4/2015 | Ristock et al. | |
| 2015/0112748 A1 | 4/2015 | Kaye et al. | |
| 2016/0070534 A1 | 3/2016 | Kripalani et al. | |
| 2016/0314716 A1 | 10/2016 | Grubbs | |
| 2017/0310826 A1 | 10/2017 | Gunasekar et al. | |
| 2018/0227337 A1 | 8/2018 | Bader-Natal et al. | |
| 2020/0014735 A1 | 1/2020 | Spencer et al. | |

OTHER PUBLICATIONS

Fraser, Neil, "Differential Synchronization," DocEng 2009, ACM, Sep. 16-18, 2009 (8 pgs) (Year: 2009).*

Day-Richter, John, "What's different about the new Google Docs: Working together, even apart," Google Drive Blog, Sep. 21, 2010, retrieved from https://drive.googleblog.com/2010/09/whats-different-about-new-goog-docs_21.html on Oct. 5, 2021 (part 1/3, 4 pgs) (Year: 2010).*

Day-Richter, John, "What's different about the new Google Docs: Conflict Resolution," Google Drive Blog, Sep. 22, 2010, retrieved from https://drive.googleblog.com/2010/09/whats-different-about-new-goog-docs_22.html on Oct. 5, 2021 (part 2/2, 6 pgs) (Year: 2010).*

Day-Richter, John, "What's different about the new Google Docs: Making collaboration fast," Google Drive Blog, Sep. 23, 2010, retrieved from https://drive.googleblog.com/2010/09/whats-different-about-new-goog-docs.html on Oct. 5, 2021 (part 3/3, 8 pgs) (Year: 2010).*

Kaur et al., "Operational Transformation in Co-Operative Editing," International Journal of Scientific & Technology Research, vol. 5, No. 6, Jan. 2016, pp. 16-20 (Year: 2016).*

Agarwal, Srijan, "Building a real-time collaborative editor using Operational Transformation," May 1, 2017, retrieved from https://srijancse.medium.com/how-real-time-collaborative-editing-work-operational-transformation-ac4902d75682 on Oct. 6, 2021 (part 1/3, 5 pgs) (Year: 2017).*

Agarwal, Srijan, "Operational Transformation, the real time collaborative editing algorithm," May 13, 2017, retrieved from https://hackernoon.com/operational-transformation-the-real-time-collaborative-editing-algorithm-bf8756683f66 on Oct. 6, 2021 (part 2/3, 11 pgs) (Year: 2017).*

Agarwal, Srijan, "Transformation Algorithms for collaborative editing," Jun. 7, 2017, 2017, retrieved from https://www.srijanagarwal.me/blog/analyzing-ot on Oct. 6, 2021 (part 3/3, 8 pgs) (Year: 2017).*

Gala, Mehul, "The enigma of Collaborative Editing," Sep. 11, 2019, retrieved from https://medium.com/@mehulgala77/concurrent-collaborative-editing-d10192e55d2e on Oct. 6, 2021 (17 pgs) (Year: 2019).*

Sun et al., "Real Differences between OT and CRDT under a General Transformation Framework for Consistency Maintenance in Co-Editors," PACM on Human-Computer Interaction, vol. 4, No. GROUP, Art. 6, Jan. 2020 (25 pgs) (Year: 2020).*

Sun et al., "Real Differences between OT and CRDT in Building Co-Editing Systems and Real World Applications," 2020 (16 pgs) (Year: 2020).*

Kumar et al., "LITEDOC: Make Collaborative Editing Fast, Scalable, and Robust," 2020 IEEE International Conference on Pervasive Computing and Communications Workshops, 2020 (6 pgs) (Year: 2020).*

* cited by examiner

COMPUTER-TO-COMPUTER USERS# EDIT AND EVENT TRANSFER AND SYNCHRONIZATION

TECHNICAL FIELD

The present disclosure relates generally to multicomputer data transferring, and more specifically to computer-to-computer users' edit and event transfer and synchronization.

BACKGROUND

In current multicomputer data transferring and video conferencing technologies, a web application can be shared among multiple attendees for editing. The organizer of the video conference has full control of the editing process. However, multiple attendees may not be able to edit the web application simultaneously. Current multicomputer data transferring and video conferencing technologies may not be configured to provide a virtual collaborative environment in which users can simultaneously co-edit a web application.

SUMMARY

Current multicomputer data transferring and video conferencing technologies may not be configured to provide a virtual collaborative environment in which users can simultaneously co-edit a web application. This disclosure contemplates systems and methods for providing a virtual collaborative environment in which users can simultaneously co-edit a web application. The web application may be any application that provides a platform to perform a task. The web application may be associated with an organization, such that the web application can be accessed on the website of the organization. For example, the web application may provide a platform to fill out an online form, open an account in the organization, access information on the account, perform transactions, etc. The web application may comprise elements such as buttons, text fields, attachment boxes, etc. The elements of the web application may be associated with collaboration tags, where each collaboration tag indicates whether a corresponding element should be modifiable by one or more particular users in a virtual collaboration room. For example, if a collaboration tag of an element indicates that the element can be modified by any of the attendees of the virtual collaboration room (i.e., the users), any of the users can modify the element. In another example, if a collaboration tag of an element indicates that the element can be modified by a first attendee (or first user), only the first user can modify the element. For example, the disclosed system may receive the configuration of the collaboration tags from the organizer of the virtual collaboration room (e.g., the first user). The disclosed system may also receive a request from the first user to generate the virtual collaboration room. In response, the disclosed system generates the virtual collaboration room in which users can simultaneously co-edit the web application.

Once the virtual collaboration room is generated and the users have joined the virtual collaboration room, the disclosed system communicates the web application to computing devices associated with the users. For example, the disclosed system communicates sessions or copies of the web application to the computing devices. As such, each user on the virtual collaboration room can edit a corresponding session of the web application. The user edits or user event may comprise moving a cursor, selecting a button, filling out a text field, attaching a file to an attachment box, scrolling up, scrolling down, navigating between webpages of the web application, or any other action that a user may perform on the web application. The disclosed system maintains the main session or copy of the web application in a memory, such as a memory of a backend server associated with the disclosed system. The disclosed system synchronizes the sessions, such that any user event, edit, or modification is transferred and synchronized across the sessions. As such, each user is able to view other users' edits on the web application in their corresponding computing device. For example, assume that a first user and a second user are in the virtual collaboration room. Also, assume that the disclosed system has sent a first session of the web application to the first user, and a second session of the web application to the second user. In this example, the first user's edits or events are transferred from the first session to the second session, and the second user's edits or events are transferred from the second session to the first session. As such, the first user can view the second user's edits on the first session, and the second user can view the first user's edits on the second session. The user events are also tunneled or transferred to the main session at the backend server. As such, the main session is updated with the latest user events, edits, or modifications.

Once the users make all the edits to the web application, they may send a commit request to the disclosed system to save the latest modification to the main session of the web application. For example, a user may click a "Continue" button on the web application to send the commit request to the disclosed system. In response, the disclosed system saves the latest modifications to the main session of the web application.

The disclosed system may be configured to customize the synchronization of user events or user edits across the sessions. For example, the disclosed system may receive the configuration of the synchronization of the user events with respect to each element from the organizer of the virtual collaboration room before generating the virtual collaboration room. For example, the disclosed system may enable the synchronization of user events on a first set of elements. As such, the user events on the first set of elements may be synchronized across the sessions. In another example, the disclosed system may disable the synchronization of user events on the second set of elements. As such, the user events on the second set of elements may not be synchronized across the sessions.

The disclosed system may also be configured to generate a virtual collaboration room for co-editing any application that provides a platform to perform a task, such as a web-based application, a software-based application, and a mobile-based application.

In one embodiment, a system for establishing a collaborative environment to facilitate co-editing on a web application comprises a memory and a processor. The memory is operable to store a web application having one or more elements comprising a button, a text field, and an attachment box. The processor is operably coupled with the memory. The processor is configured to receive, from a first user, a request to create a virtual collaboration room for the first user and a second user to synchronously co-edit the web application. The processor transmits the web application to a first computing device associated with the first user such that a first session of the web application is displayed on the first computing device. The processor transmits the web application to a second computing device associated with the second user such that a second session of the web application is displayed on the second computing device.

The processor synchronously modifies the first session and the second session with one or more events performed by one or both of the first user and the second user, wherein the one or more events comprise at least one of moving a cursor, checking the button, filling out the text field, and attaching a document in the attachment box. The processor detects a request to commit the latest modifications of the one or more events in the first session and the second session to the web application stored in the memory. The processor commits the latest modifications to the web application.

The disclosed systems provide several practical applications and technical advantages which include: 1) technology that generates a virtual collaboration room in which attendees (e.g., users) are able to co-edit a web application; 2) technology that transmits sessions or copies of the application to the users, and synchronizes the sessions, such that any user event is synchronized across the sessions, where the user events comprise moving a cursor, selecting a button, filling out a text field, attaching a file to an attachment box, scrolling up, scrolling down, navigating between webpages of the web application, etc.; 3) technology that maintains a main session or a main copy of the web application in a backend server, and updates the main session with the latest user events; 4) technology that associates elements of the web application with collaboration tags, where each collaboration tag indicates whether a corresponding element should be modifiable by one or more particular users in a virtual collaboration room; and 5) technology that customizes synchronization of the user events across the sessions.

As such, the systems described in this disclosure may improve the multicomputer data transferring and video conferencing technologies by providing a virtual collaboration room in which attendees (or users) can simultaneously co-edit a web application. Therefore, each user in the virtual collaboration room is not only able to view other users' edits on the web application but also is able to contribute to the modifications on the web application. The disclosed system may further improve the multicomputer data transferring and video conferencing technologies by providing a customized use event capability to each element of the web application based on the defined collaboration tags associated with the elements. The disclosed system may further improve the multicomputer data transferring and video conferencing technologies by providing a customized synchronization of user events across the sessions of the web application based on the provided configuration from the organizer of the virtual collaboration room.

Accordingly, the disclosed system may be integrated into a practical application of improving the flexibility and customizability of a co-editing process of a web application among multiple users. This, in turn, provides an additional practical application of increasing productivity in the co-editing process of the web application. For example, the disclosed system reduces the processing and time resources for the co-editing process of the web application that would otherwise be spent using the current multicomputer data transferring and video conferencing technologies. Accordingly, the disclosed system may further be integrated into an additional practical application of improving underlying operations of computer systems that are used for the co-editing process of the web application. The system may also or alternatively reduce or eliminate practical and technical barriers for the co-editing process of web applications.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
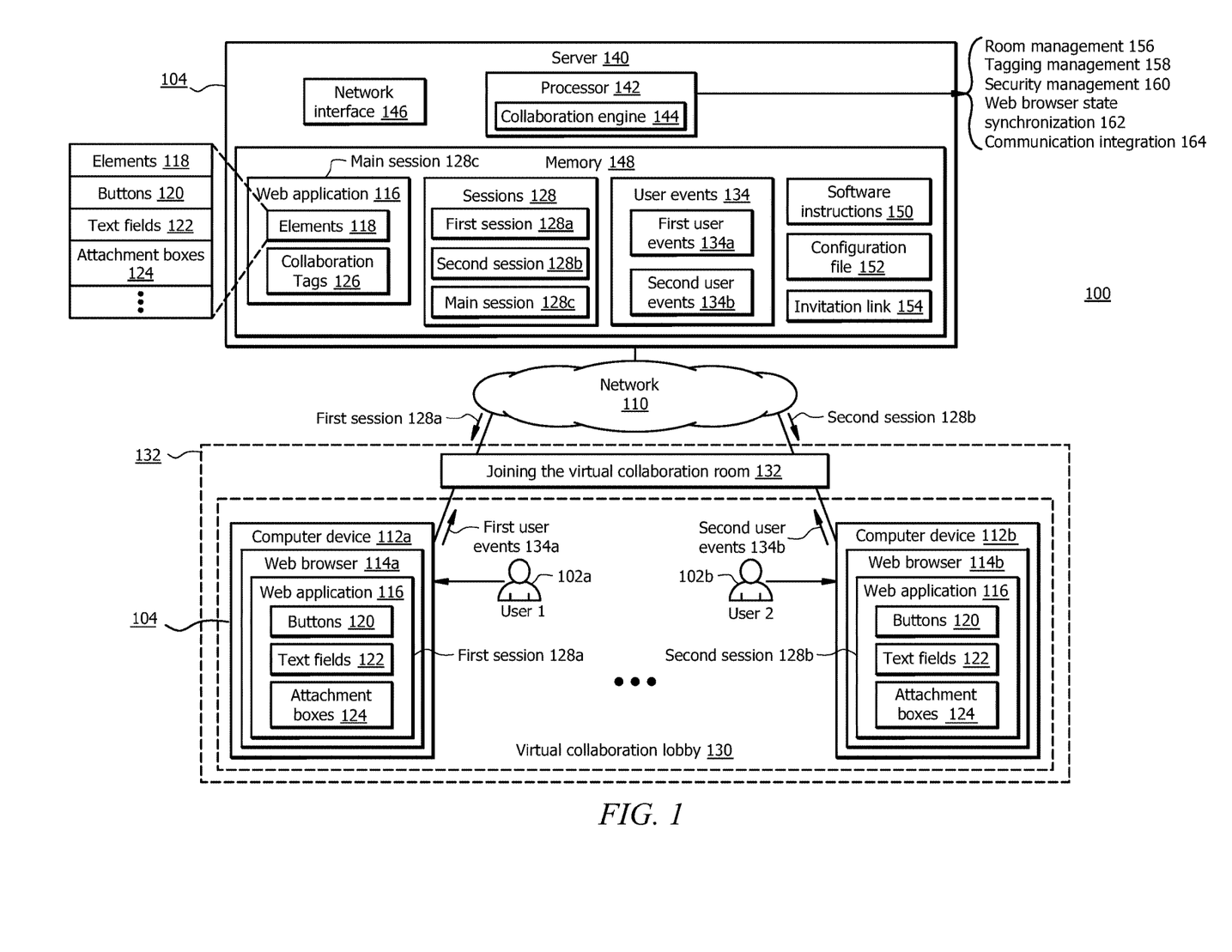
FIG. 1 illustrates an embodiment of a system configured to generate a virtual collaboration room to facilitate synchronous co-editing of a web application.

FIG. 1 illustrates one embodiment of a system 100 that is configured to establish a collaborative environment (i.e., virtual collaboration room 132) to facilitate synchronous co-editing of a web application 116. In one embodiment, system 100 comprises a server 140. In some embodiments, system 100 may further comprise a first computing device 112*a*, a second computing device 112*b*, and a network 110 that enables communications between components of the system 100. The server 140 comprises a processor 142 in signal communication with a memory 148. The memory 148 comprises software instructions 150 that when executed by the processor 142 cause the processor 142 to perform one or more functions described herein. For example, when the software instructions 150 are executed, the processor 142 executes a collaboration engine 144 to generate a virtual collaboration room 132 where invitees or users 102 can synchronously co-edit a web application 116. In other embodiments, system 100 may not have all of the components listed and/or may have other elements instead of, or in addition to, those listed above.

In general, system 100 (via the collaboration engine 144) receives a request from a first user 102*a* to create a virtual collaboration room 132 for the first user 102*a* and one or more individuals, such as the second user 102*b*, to co-edit a web application 116. The web application 116 may generally provide a platform to perform a task or a project. In a particular example, web application 116 may provide a platform to fill out an online form. The web application 116 may comprise elements 118 including buttons 120, text fields 122, attachment boxes 124, among other elements 118. The collaboration engine 144 transmits a first session 128*a* of the web application 116 to the first computing device 112*a* that is associated with the first user 102*a*, such that the first session 128*a* is displayed on a first web browser 114*a*. The first session 128*a* may be referred to as a first transient session or a first copy of the web application 116. The collaboration engine 144 transmits a second session 128*b* of the web application 116 to the second computing device 112*b* that is associated with the second user 102*b*, such that the second session 128*b* is displayed on a second web browser 114*b*. The second session 128*b* may be referred to as a second transient session or a second copy of the web application 116. The collaboration engine 144 maintains a main session 128*c* of the web application 116 in the memory 148. The collaboration engine 144 may detect first user events 134a on the first session 128a, and second user events 134b on the second session 128b, where the user events 134a and 134b comprise one or more of moving a cursor, checking a button 120, filling out a text field 122, attaching a file to an attachment box 124, etc. The collaboration engine 144 synchronously modifies the sessions 128 (i.e., the first session 128a, the second session 128b, and the main session 128c) with user events 134a and 134b. Therefore, each user 102 is able to view other's events 134, edits, and modifications on the web application 116. The collaboration engine 144 further synchronizes the first session 128a and the second session 128b with a main session 128c of the web application 116, such that the main session 128c is updated with any changes, edits, or modifications on either of the first session 128a and the second session 128b (e.g., user events 134a and 134b). Until this stage, the main session 128c may be updated with the user events 134a and 134b. However, to store these changes in the main session 128c, either of the users 102 may send a commit request to the collaboration engine 144. The collaboration engine 144 detects the commit request to store the latest modifications of the user events 134a and 134b in the web application 116. In response, the collaboration engine 144 commits the latest modifications of the user events 134a and 134b to the web application 116.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Each of the computing devices 112a and 112b is generally any device that is configured to process data and interact with users 102. Examples of computing devices 112a and 112b include, but are not limited to, a personal computer, a desktop computer, a workstation, a server, a laptop, a tablet computer, a mobile phone (such as smartphones), etc. In a particular example, the first computing device 112a may be associate with an organization 104, the first user 102a may be an employee of the organization 104, and the second user 102b may be a client of the organization 104 who wants to perform a task on the website of the organization 104, such as opening an account. As such, the second user 102b may need to fill out an online form that is provided on the web application 116 on the website of the organization 104. To facilitate opening an account for the second user 102b, the first user 102a and the second user 102b may join a virtual collaboration room 132 and synchronously co-edit the web application 116 during a collaborative session. This process is described further below.

Figure 2:
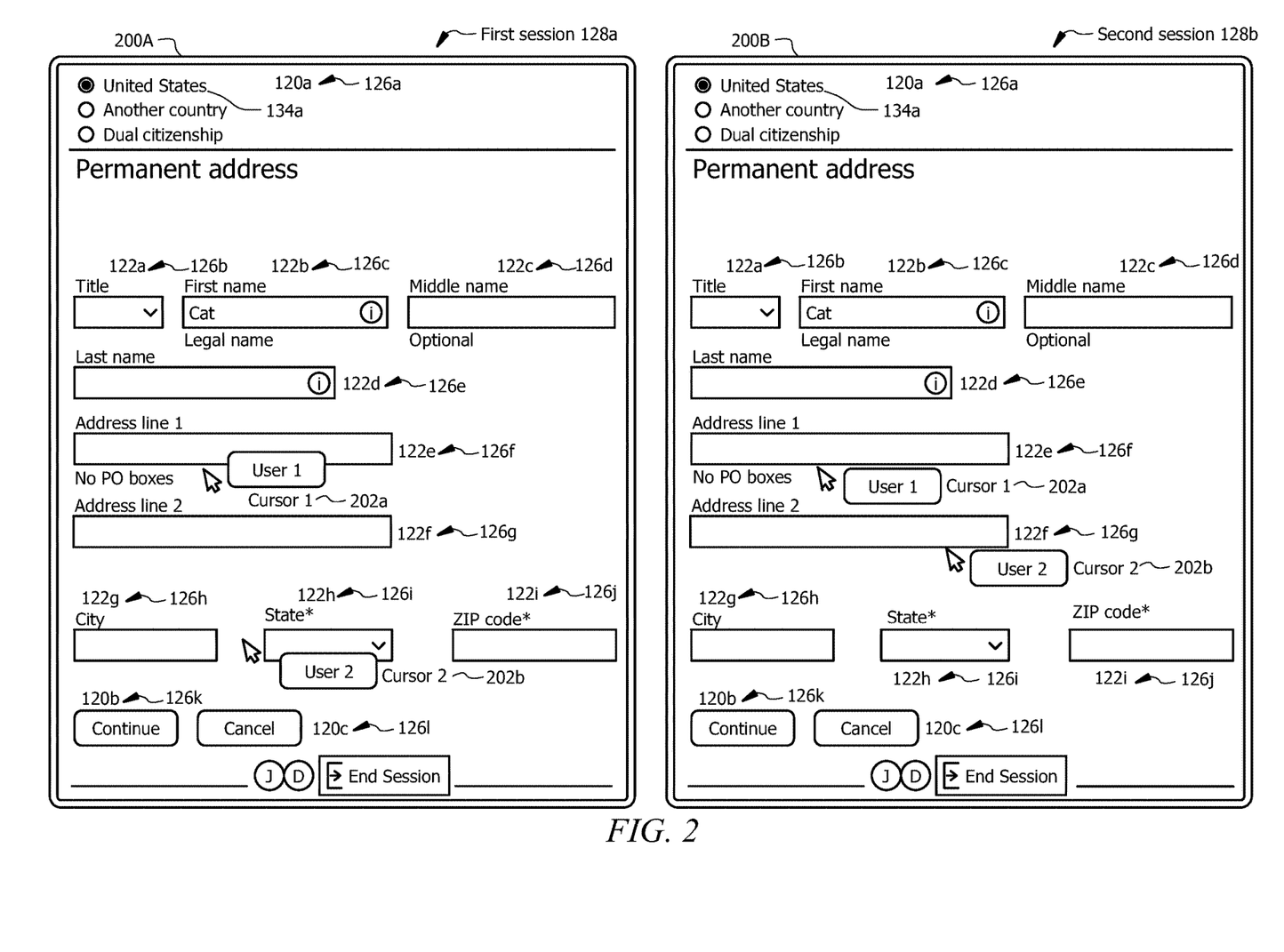
FIG. 2 illustrates example screenshots of a web application shared in the virtual collaboration room generated by the system of FIG. 1.

Web application 116 may be any application that provides a platform to users 102 to perform a task, such as filling out a form, opening an account, performing transactions, etc. The web application 116 may be associated with the organization 104, such that the web application 116 can be accessed on the website of the organization 104. The web application 116 may be presented on one or more webpages. The web application 116 comprises elements 118 that users 102 can use to interact with the web application 116. For example, elements 118 may comprise buttons 120, text fields 122, attachment boxes 124, etc. Examples of elements 118 are illustrated in FIG. 2 and described further below. Each of the elements 118 is tagged or associated with a collaboration tag 126. In a particular example, a collaboration tag 126 may comprise a Hypertext Markup Language (HTML) attribute that is associated with each element 118. The collaboration tag 126 indicates whether a corresponding element 118 should be collaborate-able or modifiable by one or more specific users 102. The collaboration tag 126 is configurable based on an event or a function of a corresponding element 118. For example, an organizer or a leader of the virtual collaboration room 132, such as the first user 102a, may define or configure the collaboration tags 126 for the elements 118 of the web application 116. The organizer of the virtual collaboration room 132 may store the collaboration tags 126 in a configuration file 152, and feed the configuration file 152 to the collaboration engine 144 to associate the elements 118 with the defined collaboration tags 126.

In one example, if the organizer of the virtual collaboration room 132 (e.g., the first user 102a) determines that a first event associated with a first element 118 should be performed by the first user 102a, a first collaboration tag 126 associated with the first element 118 is configured such that the first element 118 is modifiable in the first session 128a that is associated with the first user 102a. In another example, if the organizer of the virtual collaboration room 132 (e.g., the first user 102a) determines that a second event associated with a second element 118 should be performed by the second user 102b, a second collaboration tag 126 associated with the second element 118 is configured such that the second element 118 is modifiable in the second session 128b that is associated with the second user 102b. In another example, if the organizer of the virtual collaboration room 132 (e.g., the first user 102a) determines that a third event associated with a third element 118 can be performed by both of the first use and the second user 102b, a third collaboration tag 126 associated with the third element 118 is configured such that the third element 118 is modifiable in both the first session 128a and the second session 128b.

The collaboration tags 126 may vary for each virtual collaboration room 132 depending on attendees, responsibilities, and authority levels of the attendees in each virtual collaboration room 132. For example, if a manager and an employee of the organization are joined in a virtual collaboration room 132, collaboration tags 126 may be defined for each element 118 such that elements 118 that can be modified by the manager are modifiable by the manager, elements 118 that can be modified by the employee are modifiable by the employee, and elements 118 that can be modified by either the employee and the manager can be modified by both the employee and the manager. The collaboration tags 126 may further vary for each web application 116 depending on a task or a function that the web application 116 provides. For example, if a first web application 116 provide a platform for filling out an online form, elements 118 that are related to confidential information of the client (e.g., the second user 102b), such as a residential address, etc., may be associated with collaboration tags 126 that indicate these elements 118 to be modifiable by the second user 102b. In another example, if a second web application 118 provides a platform for performing a transaction, elements 118 related to preparing the transaction details may be associated with collaboration tags 126 that indicate these elements 118 can be modifiable by the organizer of the virtual collaboration room 132, e.g., the first user 102a. Although, FIG. 1 illustrates a web-based application 116, one of ordinary skilled in the art would appreciate other embodiments of the application 116. For example, the application 116 may be any web/software/mobile application 116. As such, the application 116 may be accessed from any platform or operating system. In the illustrated example of FIG. 1, web application 116 is accessed from a web browser 114. In this disclosure, the application 116 may interchangeably be referred to as a web application 116, a software application 116, or a mobile application 116.

Server 140 is generally a server or any other device configured to process data and communicate with computing devices (e.g., computing devices 112) via the network 110. In one example, server 140 may be a backend server 140 associated with the organization 104. The server 140 is generally configured to oversee one or more functions of the collaboration engine 144 as described further below.

Processor 142 comprises one or more processors operably coupled to the memory 148. The processor 142 is any electronic circuitry including, but not limited to, state machines, one or more central processing unit (CPU) chips, logic units, cores (e.g., a multi-core processor), field-programmable gate array (FPGAs) devices, application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the collaboration engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of method 300 as described in FIG. 3.

Network interface 146 is configured to enable wired and/or wireless communications (e.g., via network 110). The network interface 146 is configured to communicate data between the server 140 and other devices (e.g., computing devices 112), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the web application 116, sessions 128 of the web application 116 (such as the first session 128a, second session 128b, and main session 128c), user events 134 (such as the first user events 134a and second user events 134b), software instructions 150, configuration file 152 152, invitation link 154 154, and/or any other data or instructions. The software instructions 150 may comprise any suitable set of instructions, logic, rules, or code operable to execute the processor 142.

Collaboration Engine and its Operations

Collaboration engine 144 may be implemented by the processor 142 executing software instructions 150, and is generally configured to generate a virtual collaboration room 132 (or virtual collaboration session) to facilitate synchronous co-editing of an application 116 between two or more users 102. To this end, the collaboration engine 144 may be configured to provide one or more implementations, including room management 156, tagging management 158, security management 160, web browser state synchronization 162, communication integration 164, among others. These implementations are described in detail below. In brief, the collaboration engine 144 is configured to generate a virtual collaboration room 132 for users 102 to co-edit a web application 116. Once the users 102 have joined the virtual collaboration room 132, the collaboration engine 144 communicates the web application 116 to computing devices 112 from which the users 102 joined the virtual collaboration room 132. For example, the collaboration engine 144 communicates the first session 128a (or the first copy of the web application 116) to the first computing device 112a from which the first user 102a has joined the virtual collaboration room 132. Similarly, the collaboration engine 144 communicates the second session 128b (or the second copy of the web application 116) to the second computing device 112b from which the second user 102b has joined the virtual collaboration room 132. The collaboration engine 144 maintains the main session 128c (or the main copy of the web application 116) at memory 148. The collaboration engine 144 synchronizes the sessions 128a-c, such that any changes, edits, or modifications on either of the sessions 128a and 128b (e.g., user events 134a, b) are transferred and synchronized to other sessions 128. The corresponding description below describes details of the operations of the collaboration engine 144.

In one embodiment, the collaboration engine 144 is configured to create, monitor, and manage virtual collaboration rooms 132, i.e., provide the room management 156. For example, the collaboration engine 144 may create, monitor, and manage virtual collaboration rooms 132 by using the Rooms Application Programming Interface (API) library that is stored in the software instructions 150. Using the Rooms API library, the collaboration engine 144 is configured to create a virtual collaboration room 132, monitor activities of the users 102 (e.g., users 102 joining, leaving, and/or rejoining the virtual collaboration room 132), and terminate the virtual collaboration room 132. In one embodiment, the collaboration engine 144 may be configured to keep records of the virtual collaboration rooms 132, for example, creation dates, durations, activities of the users 102 (e.g., joining, leaving, and/or rejoining), among other historical records of the virtual collaboration rooms 132.

In one embodiment, the collaboration engine 144 may be configured to tag or associate the elements 118 of the web application 116 with collaboration tags 126, i.e., provide the tagging management 158. For example, the collaboration engine 144 may receive the configuration file 152 that includes collaboration tags 126 for the elements 118 from the organizer of the virtual collaboration room 132, e.g., the first user 102*a*. Examples of associating elements 118 with collaboration tags 126 are described above.

In one embodiment, the collaboration engine 144 may be configured to authenticate each user 102 prior to allowing or admitting each user 102 to join the virtual collaboration room 132, i.e., provide the security management 160. To this end, the collaboration engine 144 may generate a virtual collaboration lobby 130 which may correspond to a landing webpage for the users 102 to enter the virtual collaboration room 132 upon authentication. For example, assume that the first user 102*a* is the organizer of the virtual collaboration room 132, and invites the second user 102*b* to the virtual collaboration room 132. To invite the second user 102*b* to the virtual collaboration room 132, the first user 102*a* may send a request to the collaboration engine 144 to generate the virtual collaboration room 132. In response, the collaboration engine 144 generates the virtual collaboration room 132. The collaboration engine 144 also generates an invitation link 154 to the virtual collaboration lobby 130 which is a landing page to enter the virtual collaboration room 132 upon authentication. By following the invitation link 154, the first user 102*a* and the second user 102*b* can enter the virtual collaboration lobby 130 and provide their login credentials. If the collaboration engine 144 determines that the provided login credentials are valid, the users 102 can join the virtual collaboration room 132. The login credentials may be login credentials associated with the organization 104 or login credentials previously provided to the users 102 by the collaboration engine 144. In another example, a passcode may be used instead of or in addition to the login credentials. In this way, the collaboration engine 144 may authenticate each user 102 prior to allowing or admitting each user 102 to join the virtual collaboration room 132.

Once the users 102 are authenticated and join the virtual collaboration room 132, the collaboration engine 144 transmits the first session 128*a* to the first computing device 112*a*, and the second session 128*b* to the second computing device 112*b*. For example, the collaboration engine 144 may transmit the first session 128*a* and the second session 128*b* using a Web Socket API library stored in the software instructions 150. In other embodiments where the application 116 is a software or mobile application 116, any API communication method may be used.

Furthermore, the collaboration engine 144 synchronizes states of the web browsers 114*a* and 114*b* across the computing devices 112*a* and 112*b*, i.e., provides the web browser state synchronization 162. For example, the collaboration engine 144 may synchronize the states of the web browsers 114*a* and 114*b* by using a Document Object Model (DOM) manager library stored in the software instructions 150. The DOM manager library is responsible for processing user events 134 that include cursor events (e.g., cursor movements, clicks, and scrolls), keyboard events (e.g., keystrokes), and view navigations (e.g., scrolling up, scrolling down, navigating between webpages of the web application 116). In the illustrated example, the collaboration engine 144 receives first user events 134*a* performed by the first user 102*a* on the first session 128*a*, and second user events 134*b* performed by the second user 102*b* on the second session 128*b*. The collaboration engine 144 processes the user events 134*a* and 134*b*, and transmits those across the computing devices 112*a* and 112*b* to be displayed on the web browsers 114*a* and 114*b*. The collaboration engine 144 also updates the main session 128*c* with the user events 134*a* and 134*b*. In this way, the collaboration engine 144 is configured to synchronize the sessions 128*a-c* with each other, such that any changes, edits, or modifications on either of the sessions 128 (e.g., user events 134*a* and 134*b*) are transferred to other sessions 128. Examples of synchronizing sessions 128 and transmitting user events 134 across the computing devices 112 are described in the corresponding description below in conjunction with FIG. 2.

Referring to FIG. 2, a screenshot 200A illustrates a foreground page of the first session 128*a* of the web application 116, and a screenshot 200B illustrates a foreground page of the second session 128*b* of the web application 116, where the first session 128*a* and the second session 128*b* are synchronized and are in the virtual collaboration room 132 generated by the system 100 of FIG. 1. As described above in FIG. 1, the first session 128*a* is transmitted to the first computing device 112*a* associated with the first user 102*a*, and the second session 128*b* is transmitted to the second computing device 112*b* associated with the second user 102*b*. In the example of FIG. 2, assume that the first user 102*a* is an employee of the organization 104, the second user 102*b* is a client of the organization 104, and the first user 102*a* and the second user 102*b* have joined the virtual collaboration room 132 to fill out an online form provided in the web application 116 to, for example, open an account for the second user 102*b*.

In the screenshots 200A, the foreground page of the first session 128*a* shows buttons 120*a* to 120*c* and text fields 122*a* to 122*i*. In the screenshot 200B, the foreground page of the second session 128*b* also shows buttons 120*a* to 120*c* and text fields 122*a* to 122*i*. Each of the buttons 120*a* to 120*c* and text fields 122*a* to 122*i* is associated with a collaboration tag 126 from collaboration tag 126*a* to 126*l*, as described in FIG. 1. For example, assume that a collaboration tag 126*a* associated with the button 120*a* indicates that the button 120*a* is modifiable by both the first user 102*a* and the second user 102*b*. Also, assume that the first user 102*a* selects the button 120*a* in the first session 128*a*. The collaboration engine 144 registers this event as a user event 134*a* from the first user 102*a*. The collaboration engine 144 transfers the user event 134*a* to the second session 128*b*. As such, button 120*a* gets updated or selected in the second session 128*b* (as shown in the screenshot 200B) as the button 120*a* is selected in the first session 128*a* shown in the screenshot 200A. The collaboration engine 144 also updates the main session 128*c* (see FIG. 1) with the user event 134*a*. In other words, the collaboration engine 144 synchronously modifies the second session 128*b* and the main session 128*c* with the user event 134*a* detected in the first session 128*a*. If the second user 102*b* and/or the first user 102*a* change the selected button 120*a*, the collaboration engine 144 synchronously modifies the sessions 128*a-c* according to the latest change to the button 120*a*. In another example, assume that the collaboration tag 126*a* indicates that the button 120*a* is only modifiable by the first user 102*a*. As such, in the second session 128*b*, the second user 102*b* is not able to change the button 120*a*.

In another example, assume that a collaboration tag 126*c* associated with the text field 122*b* indicates that the text field 122*b* is modifiable by the second user 102*b*. Also, assume that the second user 102*b* writes "Cat" in the text field 122*b*. The collaboration engine 144 registers this event as a user event 134*b* from the second user 102*b*. The collaboration engine 144 transfers the user event 134*b* to the first session 128*a*. As such, the text field 122*b* gets written-in or updated in the first session 128*a* (as shown in the screenshot 200A) as it is written-in in the second session 128*b* shown in the screenshot 200B. The collaboration engine 144 also updates the main session 128*c* (see FIG. 1) with the user event 134*b*. In other words, the collaboration engine 144 synchronously modifies the first session 128a and the main session 128c with the user event 134b detected in the second session 128b. Furthermore, in this example, the first user 102a is not able to make any changes to the text field 122b since the collaboration tag 126c indicates that it is only modifiable by the second user 102b.

Referring back to FIG. 1, in one embodiment, the collaboration engine 144 may be configured to establish audio, text, and/or video communications between the users 102, i.e., provide the communication integration 164. For example, while the users 102 are joined in the virtual collaboration room 132, the users 102 are able to enable audio communications, for example, using microphones operably coupled with their respective computing devices 112. In another example, while the users 102 are joined in the virtual collaboration room 132, the users 102 are able to write text messages on a chat window displayed beside the web application 116. In another example, while the users 102 are joined in the virtual collaboration room 132, the users 102 are able to enable video communications, for example, using webcams and/or cameras operably coupled with their respective computing devices 112.

In one embodiment, the collaboration engine 144 may be configured to customize synchronization of different elements 118 for one or more users 102. For example, the collaboration engine 144 may customize synchronization of different elements 118 based on instructions received from the organizer of the virtual collaboration room 132 (e.g., the first user 102a) that is included in the configuration file 152. As such, the collaboration engine 144 may disable synchronization of a first set of elements 118, enable synchronization of a second set of elements 118, enable synchronization of one or more elements 118 for a first set of users 102, disable synchronization of one or more elements 118 for a second set of users 102, enable (or disable) keeping the history of certain elements 118 and user events 134, etc. Examples of customizing synchronization of different elements 118 are described in the corresponding description below in conjunction with FIG. 2.

Referring to FIG. 2, for example, assume that the organizer of the virtual collaboration room 132 (e.g., the first user 102a) has defined that changes to the text field 122b be synchronized among the first session 128a and the second session 128b. As such, in this example, any changes made by any of the users 102 to the text field 122b may be transferred across sessions 128a and 128b. In another example, assume that the organizer of the virtual collaboration room 132 (e.g., the first user 102a) has defined that the text field 122c not to be synchronized among the sessions 128a and 128b. Also, assume that a collaboration tag 126d associated with the text field 122c indicates that the text field 122c is modifiable only by the first user 102a. As such, any change that the first user 102a makes to the text field 122c is not transferred across sessions 128a and 128b. In another example, assume that the collaboration tag 126d indicates that the text field 122c not to be synchronized among the sessions 128a and 128b, and the text field 122c is modifiable only by the second user 102b. As such, any change that the second user 102b makes to the text field 122c is not transferred across sessions 128a and 128b. In another example, assume that the organizer of the virtual collaboration room 132 (e.g., the first user 102a) has disabled keeping the history of user events 134 for the text field 122c in the configuration file 152. As such, in this example, the collaboration engine 144 does not keep the history of user events 134 on the text field 122c. In any of the examples above, the user events 134a and 134b are tunneled to the main session 128c (see FIG. 1). As such, by tunneling or synchronizing the user events 134a and 134b with the main session 128, making duplicates of web application 116 can be avoided.

Until this stage, the main session 128c (see FIG. 1) may have been updated with the user events 134. However, to store these changes in the main session 128c, a user 102 may send a commit request to the collaboration engine 144. For example, once the users 102 make all the changes and modifications to the web application 116, a user 102 may commit or save the latest modifications to the main session 128c, by clicking a "Continue" button 120b. Clicking the "Continue" button 120b may correspond to sending the commit request to the collaboration engine 144. In response, the collaboration engine 144 saves the latest modifications (e.g., user events 134a, b) to the main session 128c. In one example, if the collaboration tag 126k associated with the "Continue" button 120b indicates that it can be pressed by one or both of the first user 102a and the second user 102b, any of the users 102a and 102b may send the commit request to the collaboration engine 144. In another example, if the collaboration tag 126k indicates that the "Continue" button 120b can be pressed by the first user 102a, the first user 102a may send the commit request to the collaboration engine 144. In another example, if the collaboration tag 126k indicates that the "Continue" button 120b can be pressed by the second user 102b, the second user 102b may send the commit request to the collaboration engine 144.

Referring back to FIG. 1, although FIG. 1 illustrates two users 102 (i.e., the first user 102a and the second user 102b) are joined in the virtual collaboration lobby 130 and the virtual collaboration room 132, the present disclosure contemplates that any number of users 102 can join the virtual collaboration lobby 130 and/or the virtual collaboration room 132. As such, each of the users 102 joined to the virtual collaboration room 132 can edit and modify the web application 116, and they can view other users' edits and modifications. Furthermore, any combination of the attendees (i.e., users 102) can take control editing one or more particular element 118 of the web application 116 based on the preconfigured collaboration tags 126. Furthermore, any number of sessions 128 may be communicated to the users 102, and synchronized across computing devices 112.

In one embodiment, the system 100 may be configured to send a notification message to users 102 when any of the users 102 makes an edit in the web application 116. In one embodiment, the collaboration engine 144 may be configured to obtain consent from the users 102 to store their user data or user events 134. For example, the collaboration engine 144 may send a consent request message to a user 102 requesting permission to record their user events 134. Upon receiving an acknowledgment from the user 102, the collaboration engine 144 may record their user events 134.

In one embodiment, the collaboration engine 144 may be integrated into any existing web/mobile/software application 116. For example, the collaboration engine 144 may be implemented in a backend server 140 that is configured to oversee operations of an existing application 116. Users 102 of the existing application 116 may associate the elements 118 of the existing application 116 with collaboration tags 126 outside of the development process of the existing application 116. As such, the existing application 116 may be shared among multiple users 102 for the co-editing process. In this way, the collaboration engine 144 may be a stand-alone solution that facilitates co-editing any existing application 116.

In one embodiment, the system 100 facilitates to store the application 116, sessions 128, and user events 134 in a local memory (e.g., memory 148) of the organization 104, thus, obviating the need for using commercial application sharing, file sharing, document sharing, and web conferencing solutions. Furthermore, by storing the application 116, sessions 128, and user events 134 in the local memory 148, user data or user events 134 that are entered in the application 116 are secured from outsiders, databases, and computing devices outside of the organization 104.

Example Screenshots of the First Session and the Second Session of the Web Application FIG. 2 illustrates a screenshot 200A of the first session 128a of the web application 116 and a screenshot 200B of the second session 128b of the web application 116, where the first session 128a and the second session 128b are synchronized and in the virtual collaboration room 132 generated by the system 100 of FIG. 1. Aspects of the screenshots 200A and 200B are described above in FIG. 1, and additional aspects are described below.

As can be seen in either of the screenshots 200A and 200B, a first cursor 202a and a second cursor 202b are shown. The first cursor 202a is associated with the first user 102a, and the second cursor 202b is associated with the second user 102b. Each cursor 202 is accompanied by one or more indicators indicating that the cursor 202 is associated with a particular user 102. In the illustrated example, each cursor 202 is accompanied by a text indicator specifying a corresponding user 102 that the cursor 202 is associated with. Furthermore, each cursor 202 is shown with a different color as another indicator specifying a corresponding user 102 that the cursor 202 is associated with. The collaboration engine 144 also transfers movements of the cursors 202 across the sessions 128. For example, if the first user 102a moves the first cursor 202a from a first location to a second location on the foreground of the first session 128a, the collaboration engine 144 transfers and displays this movement to the second session 128b. Likewise, the collaboration engine 144 transfers and displays movements of the second cursor 202b from the second session 128b to the first session 128a.

In one embodiment, the collaboration engine 144 may transfer and synchronize view navigations across sessions 128. For example, assume that the first user 102a scrolls down on the foreground of the first session 128a, while the second user 102b does not scroll down on the foreground of the second session 128b. In this example, the collaboration engine 144 may transfer the scrolling down user event 134 from the first session 128a to the second session 128b, such that the view of the second session 128b would be synchronized with the view of the first session 128a. In other examples, the collaboration engine 144 may transfer and synchronize any view navigation across sessions 128, such as scrolling down, scrolling up, navigating between webpages, etc.

In one embodiment, the collaboration engine 144 may customize transferring and synchronizing user events 134, such as view navigations. For example, the collaboration engine 144 may disable synchronization for scrolling up and scrolling down on the foreground webpage, and enable synchronization for navigating between webpages. As such, the view on the foreground webpage is not synchronized between sessions 128, such that each of the first user 102a and second user 102b can see a different view of the foreground webpage. Furthermore in this example, since navigating between webpages is synchronized, if any of the users 102 navigates to another webpage, this event is transferred and synchronized across sessions 128. In another example, the collaboration engine 144 may enable synchronization for scrolling up and down on the foreground webpage, and disable synchronization for navigating between webpages. In another example, the collaboration engine 144 may customize synchronization of the navigation views in any other manner, based on received instructions from the organizer of the virtual collaboration room 132 in the configuration file 152.

Figure 3:
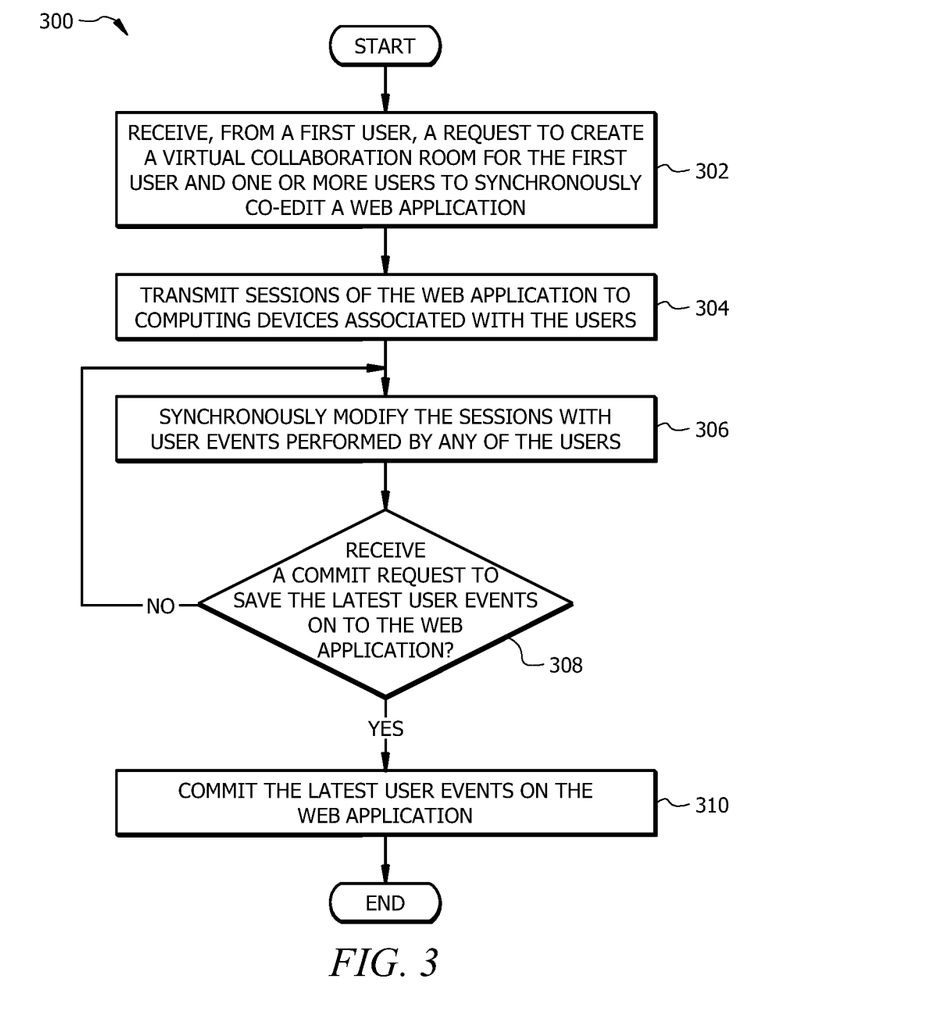
FIG. 3 illustrates an example flowchart of a method for generating a virtual collaboration room to facilitate synchronous co-editing of a web application.

Example Method for Generating a Virtual Collaboration Room to Co-Edit an Application FIG. 3 illustrates an example flowchart of a method 300 for generating a virtual collaboration room 132 to facilitate co-editing an application 116 by users 102. Modifications, additions, or omissions may be made to method 300. Method 300 may include more, fewer, or other steps. For example, steps may be performed in parallel or in any suitable order. While at times discussed as the system 100, processor 142, collaboration engine 144, or components of any of thereof performing steps, any suitable system or components of the system may perform one or more steps of the method 300. For example, on or more steps of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 302-310.

Method 300 begins at step 302 where the collaboration engine 144 receives a request from a first user 102a to create a virtual collaboration room 132 for the first user 102a and one or more users 102 to synchronously co-edit a web application 116. As such, the first user 102a may be the organizer of the virtual collaboration room 132. For example, the first user 102a may send the request to the collaboration engine 144 by using user interfaces operably coupled with the computing device 112a. The first user 102a may also send a configuration file 152 to the collaboration engine 144, where collaboration tags 126 for elements 118 in the web application 116 are defined. Each collaboration tag 126 indicates whether a corresponding element 118 should be modifiable by one or more specific users 102. Examples of defining collaboration tags 126 for different element 118 are described in FIGS. 1 and 2.

Upon receiving the request from the first user 102a, the collaboration engine 144 generates the virtual collaboration room 132, and an invitation link 154 to join the virtual collaboration room 132, similar to that described in FIG. 1. The first user 102a receives the invitation link 154, sends the invitation link 154 to the other users 102 via the network 110. By following the invitation link 154, the first user 102a and the other users 102 can enter a virtual collaboration lobby 130 which is a landing page to enter the virtual collaboration room 132 upon authentication. The collaboration engine 144 may authenticate the users 102, for example, by validating login credentials, passcodes, etc., similar to that described above in FIG. 1.

At step 304, the collaboration engine 144 transmits sessions 128 of the web application 116 to computing devices 112 associated with the users 102. The sessions 128 correspond to transient copies of the web application 116. For example, assuming that the first user 102a and the second user 102b are joined the virtual collaboration room 132, the collaboration engine 144 transmits the first session 128a to the computing device 112a (associated with the first user 102a), and the second session 128b to the computing device 112b (associated with the second user 102b), similar to that described above in FIG. 1. The collaboration engine 144 maintains the main session 128c of the web application 116 in the memory 148.

At step 306, the collaboration engine 144 synchronously modifies the sessions 128a-c with user events 134 performed by any of the users 102. For example, the collaboration engine 144 receives the user events 134, including the user events 134a performed by the first user 102a and user events 134b performed by the second user 102b. The user events 134 comprise one or more of moving a cursor 202, checking a button 120, filling out a text field 122, attaching a file to an attachment box 124, or any other action that a user 102 may perform on the web application 116. The collaboration engine 144 transfers and synchronizes the user events 134 between the sessions 128, similar to that described above in FIGS. 1 and 2.

At step 308, the collaboration engine 144 determines whether it received a commit request to save the latest user events 134 on the web application 116. For example, the collaboration engine 144 determines that it received the commit request by detecting that a user 102 has pressed a "Continue" button 120b, similar to that described in FIG. 2. If the collaboration engine 144 determines that it has not received the commit request, method 300 returns to step 306 where the collaboration engine 144 continues to synchronously modify the sessions 128 with user events 134. Otherwise, method 300 proceeds to step 310.

At step 310, the collaboration engine 144 commits the latest user events 134 to the web application 116. In this process, the collaboration engine 144 saves the latest user events 134 to the main session 128c.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements 118 or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for establishing a collaborative environment to facilitate co-editing on a web application, comprising:
   a memory operable to store a web application having one or more elements comprising a first button, a second button, and an attachment box; and
   a processor operably coupled with the memory, and configured to:
      receive, from a first user, a request to create a virtual collaboration room for the first user and a second user to synchronously co-edit a subset of the one or more elements that are synchronized between a first session of the web application associated with the first user, and a second session of the web application associated with the second user;
      transmit the web application to a first computing device associated with the first user such that the first session of the web application is displayed on the first computing device;
      transmit the web application to a second computing device associated with the second user such that the second session of the web application is displayed on the second computing device;
      customize a synchronization of each of the one or more elements for each of the first user and the second user such that:
         changes to each of the first button and the attachment box by the first user and the second user are customized to be synchronous between the first session and the second session;
         changes to the second button by the first user are customized to be asynchronous between the first session and the second session; and
         changes to the second button by the second user are not registered;
      synchronously modify the first session and the second session with one or more events performed by one or both of the first user and the second user, wherein the one or more events comprise at least one of actuating the first button, and attaching a file in the attachment box;
      detect a request to commit the latest modifications of the one or more events in the first session and the second session to the web application stored in the memory, wherein detecting the request to commit the latest modifications of the one or more events comprises detecting that the second button on the web application is pressed by the first user; and
      commit the latest modifications to the web application.

2. The system of claim 1, wherein each element from the one or more elements is associated with a collaboration tag indicating whether the element should be modifiable by one or both of the first user and the second user.

3. The system of claim 2, wherein the collaboration tag is configurable based at least in part upon an event associated with a corresponding element, such that:
   if a first event associated with a first element from the one or more elements should be performed by the first user, a first collaboration tag associated with the first element is configured so that the first element is modifiable in the first session of the web application;
   if a second event associated with a second element from the one or more elements should be performed by the second user, a second collaboration tag associated with the second element is configured so that the second element is modifiable in the second session of the web application; and
   if a third event associated with a third element from the one or more elements can be performed by one or both of the first user and the second user, a third collaboration tag associated with the third element is configured so that the third element is modifiable in one or both of the first session and the second session.

4. The system of claim 1, wherein the processor is further configured to create a virtual collaboration lobby page for the first user and the second user to wait until the virtual collaboration room is created.

5. The system of claim 1, wherein the processor is further configured to:
forward an invitation link originated from the first user to the second user, wherein the invitation link corresponds to a link to join the virtual collaboration room; and
authenticate the second user by validating login credentials associated with the second user used to join the virtual collaboration room.

6. The system of claim 1, wherein detecting the request to commit the latest modifications to the web application stored in the memory comprises at least one of:
detecting that the first user requested to commit the latest modifications to the web application; and
detecting that the second user requested to commit the latest modifications to the web application.

7. The system of claim 1, wherein:
the processor is further configured to receive, from the first user, a configuration file comprising one or more collaboration tags for the one or more elements prior to creating the virtual collaboration room; and
the one or more collaboration tags indicate whether each of the one or more elements should be modifiable by one or both of the first user and the second user.

8. A method for establishing a collaborative environment to facilitate co-editing on a web application, comprising:
receiving, from a first user, a request to create a virtual collaboration room for the first user and a second user to synchronously co-edit a subset of the one or more elements that are synchronized between a first session of a web application associated with the first user, and a second session of the web application associated with the second user, wherein the web application has one or more elements comprising a first button, a second button, and an attachment box;
transmitting the web application to a first computing device associated with the first user such that the first session of the web application is displayed on the first computing device;
transmitting the web application to a second computing device associated with the second user such that the second session of the web application is displayed on the second computing device;
customizing a synchronization of each of the one or more elements for each of the first user and the second user such that:
changes to each of the first button and the attachment box by the first user and the second user are customized to be synchronous between the first session and the second session;
changes to the second button by the first user are customized to be asynchronous between the first session and the second session; and
changes to the second button by the second user are not registered;
synchronously modifying the first session and the second session with one or more events performed by one or both of the first user and the second user, wherein the one or more events comprise at least one of actuating the first button, and attaching a file in the attachment box;
detecting a request to commit the latest modifications of the one or more events in the first session and the second session to the web application stored in a memory, wherein detecting the request to commit the latest modifications of the one or more events comprises detecting that the second button on the web application is pressed by the first user; and
committing the latest modifications to the web application.

9. The method of claim 8, wherein each element from the one or more elements is associated with a collaboration tag indicating whether the element should be modifiable by one or both of the first user and the second user.

10. The method of claim 9, wherein the collaboration tag is configurable based at least in part upon an event associated with a corresponding element, such that:
if a first event associated with a first element from the one or more elements should be performed by the first user, a first collaboration tag associated with the first element is configured so that the first element is modifiable in the first session of the web application;
if a second event associated with a second element from the one or more elements should be performed by the second user, a second collaboration tag associated with the second element is configured so that the second element is modifiable in the second session of the web application; and
if a third event associated with a third element from the one or more elements can be performed by one or both of the first user and the second user, a third collaboration tag associated with the third element is configured so that the third element is modifiable in one or both of the first session and the second session.

11. The method of claim 8, further comprising creating a virtual collaboration lobby page for the first user and the second user to wait until the virtual collaboration room is created.

12. The method of claim 8, further comprising:
forwarding an invitation link originated from the first user to the second user, wherein the invitation link corresponds to a link to join the virtual collaboration room; and
authenticating the second user by validating login credentials associated with the second user used to join the virtual collaboration room.

13. The method of claim 8, wherein detecting the request to commit the latest modifications to the web application comprises at least one of:
detecting that the first user requested to commit the latest modifications to the web application; and
detecting that the second user requested to commit the latest modifications to the web application.

14. A computer program comprising executable instructions stored in a non-transitory computer-readable medium that when executed by a processor causes the processor to:
receive, from a first user, a request to create a virtual collaboration room for the first user and a second user to synchronously co-edit a web application, wherein the web application has one or more elements comprising a first button, a second button, and an attachment box;
transmit the web application to a first computing device associated with the first user such that the first session of the web application is displayed on the first computing device;
transmit the web application to a second computing device associated with the second user such that the second session of the web application is displayed on the second computing device;

customize a synchronization of each of the one or more elements for each of the first user and the second user such that:
- changes to each of the first button and the attachment box by the first user and the second user are customized to be synchronous between the first session and the second session;
- changes to the second button by the first user are customized to be asynchronous between the first session and the second session; and
- changes to the second button by the second user are not registered;

synchronously modify the first session and the second session with one or more events performed by one or both of the first user and the second user, wherein the one or more events comprise at least one of actuating the first button, and attaching a file in the attachment box;

detect a request to commit the latest modifications of the one or more events in the first session and the second session to the web application stored in a memory, wherein detecting the request to commit the latest modifications of the one or more events comprises detecting that the second button on the web application is pressed by the first user; and commit the latest modifications to the web application.

15. The computer program of claim 14, wherein each element from the one or more elements is associated with a collaboration tag indicating whether the element should be modifiable by one or both of the first user and the second user.

16. The computer program of claim 15, wherein the collaboration tag is configurable based at least in part upon an event associated with a corresponding element, such that:
- if a first event associated with a first element from the one or more elements should be performed by the first user, a first collaboration tag associated with the first element is configured so that the first element is modifiable in the first session of the web application;
- if a second event associated with a second element from the one or more elements should be performed by the second user, a second collaboration tag associated with the second element is configured so that the second element is modifiable in the second session of the web application; and
- if a third event associated with a third element from the one or more elements can be performed by one or both of the first user and the second user, a third collaboration tag associated with the third element is configured so that the third element is modifiable in one or both of the first session and the second session.

17. The computer program of claim 14, wherein the processor is further configured to create a virtual collaboration lobby page for the first user and the second user to wait until the virtual collaboration room is created.

18. The computer program of claim 14, wherein the processor is further configured to:
- forward an invitation link originated from the first user to the second user, wherein the invitation link corresponds to a link to join the virtual collaboration room; and
- authenticate the second user by validating login credentials associated with the second user used to join the virtual collaboration room.

19. The computer program of claim 14, wherein detecting the request to commit the latest modifications to the web application stored in the memory comprises at least one of:
- detecting that the first user requested to commit the latest modifications to the web application; and
- detecting that the second user requested to commit the latest modifications to the web application.

20. The computer program of claim 14, wherein:
- the processor is further configured to receive, from the first user, a configuration file comprising one or more collaboration tags for the one or more elements prior to creating the virtual collaboration room; and
- the one or more collaboration tags indicate whether each of the one or more elements should be modifiable by one or both of the first user and the second user.

\* \* \* \* \*

UNITED STATES PATENT AND TRADEMARK OFFICE
CERTIFICATE OF CORRECTION

| | |
|---|---|
| PATENT NO. | : 11,366,583 B1 |
| APPLICATION NO. | : 17/165261 |
| DATED | : June 21, 2022 |
| INVENTOR(S) | : Vyas et al. |

It is certified that error appears in the above-identified patent and that said Letters Patent is hereby corrected as shown below:

On the Title Page

Under item (54), after "Computer-To-Computer…" please delete "Users# Edit" and please insert --Users' Edit--, therefor.

In the Specification

Column 1, Line 1, after "Computer-To-Computer.." please delete "Users# Edit" and please insert --Users' Edit--, therefor.

Signed and Sealed this
Twenty-third Day of August, 2022

*Katherine Kelly Vidal*

Katherine Kelly Vidal
*Director of the United States Patent and Trademark Office*